United States Patent [19]

Lin

[11] Patent Number: 5,474,174

[45] Date of Patent: Dec. 12, 1995

[54] COMPACT DISK CONTAINER

[76] Inventor: Shih-Hsien Lin, No. 34, Alley 19, Lane 325, Chien Kang Rd., Taipei, Taiwan

[21] Appl. No.: 266,492

[22] Filed: Jun. 27, 1994

[51] Int. Cl.⁶ .................................................. B65D 85/57
[52] U.S. Cl. .................... 206/310; 206/308.1; 312/9.41; 312/9.58
[58] Field of Search .................................. 206/309, 310, 206/312, 308.1; 312/9.41, 9.42, 9.58, 9.47

[56] References Cited

U.S. PATENT DOCUMENTS

| | | | |
|---|---|---|---|
| 5,099,995 | 3/1992 | Karakane et al. | 206/308.1 |
| 5,244,084 | 9/1993 | Chan | 206/308.1 |
| 5,425,450 | 6/1995 | Lin | 206/310 |

Primary Examiner—David T. Fidei
Attorney, Agent, or Firm—Morton J. Rosenberg; David I. Klein

[57] ABSTRACT

A compact disk container including an upper cover including a vertical wall downwardly depending from one side thereof, an elongated L-shaped portion downwardly depending from a bottom thereof, an elongated inverted T-shaped portion downwardly depending from the bottom and close to another side thereof, and a raised portion having a through hole counterbored at both ends, a lower cover including a recess enclosed by a front side wall, a right side wall, a left side wall, and a rear side wall, and a disk holder fitted into the lower cover and including a recess for receiving a compact disk, a retainer at a center of the recess for keeping the compact disk in place, and an opening for receiving the pivot member of the lower cover, whereby the upper cover can be turned out of the compact disk container thereby enabling the compact disk to be conveniently stored or retrieved.

1 Claim, 5 Drawing Sheets

COMPACT DISK CONTAINER

BACKGROUND OF THE INVENTION

It has been found that the conventional compact disc container (see FIG. 6) consists of an upper cover A, a lower cover B hingedly connected with the upper cover at one side, and a disc holder C fitted in the lower cover B. The upper cover A is formed at both sides with a vertical side wall A1 having a protuberance A2. The lower cover B is formed at both sides B1 with a cavity B2 adapted to receive the protuberance A2 of the upper cover A. The disc holder C is formed with a retainer C1 at the center for keeping-a compact disc in place. However, such a compact disc container has the following drawbacks:

1. It is often confusing as to finding out the correct direction to open the compact disc container.
2. The hinge connection between the upper cover and the lower cover is so weak that it will be easily broken when dropping down on the ground.

Actually, the conventional compact disc container has too many other disadvantages to be enumerated and must be improved.

Therefore, it is an object of the present invention to provide a compact disc container which can obviate and mitigate the above-mentioned drawbacks.

SUMMARY OF THE INVENTION

This invention relates to an improved compact disc container.

It is the primary object of the present invention to provide a compact disc container which is easy to open.

It is another object of the present invention to provide a compact disc container which is sturdy in construction.

It is still another object of the present invention to provide a compact disc container which is durable in use.

It is still another object of the present invention to provide a compact disc container which enables a song book, brochure, or the like to be inserted therein or removed conveniently conveniently.

It is a further object of the present invention to provide a compact disc container which is fit for practical use.

The other objects and merits and a fuller understanding of the present invention will be obtained by those having ordinary skill in the art when the following detailed description is read in conjunction with the accompanying drawings wherein like numerals refer to like or similar part.

DETAILED DESCRIPTION OF THE PREFERRED EMBODIMENT

Figure 1:
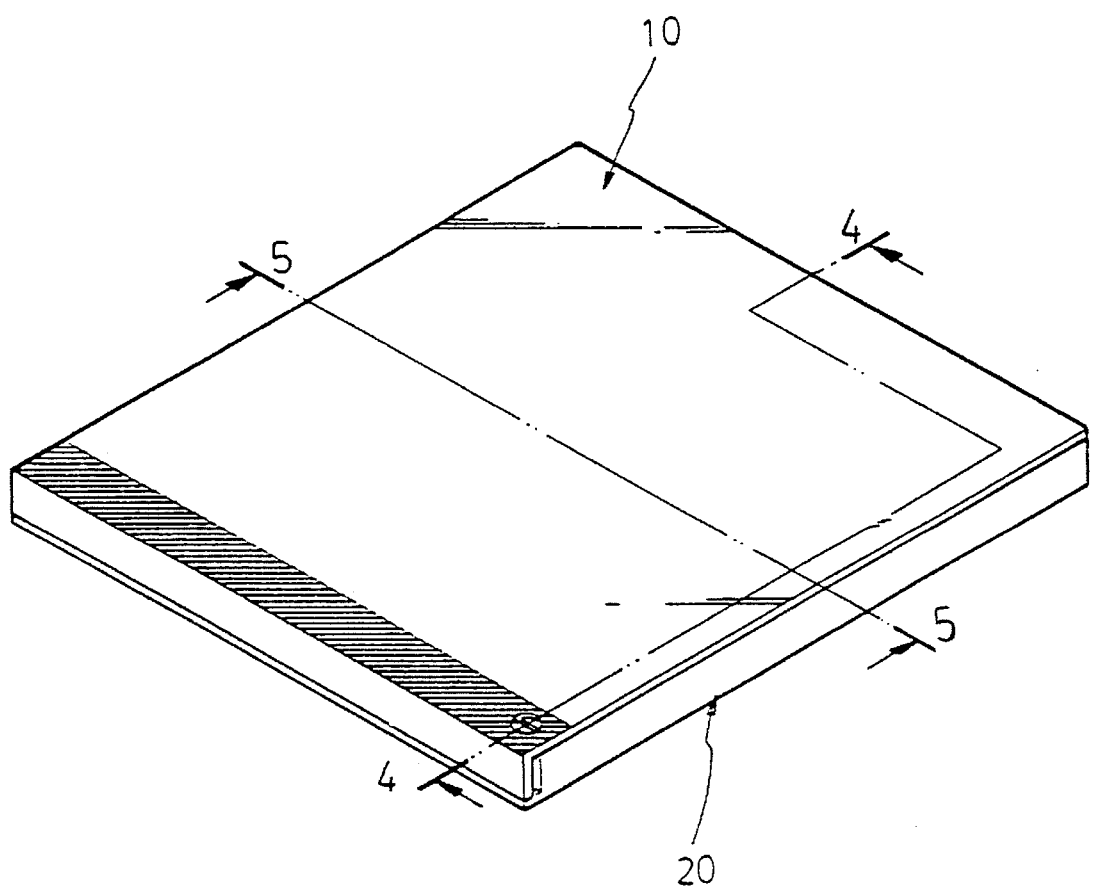
FIG. 1 is a perspective view of the present invention.

For the purpose of promoting an understanding of the principles of the invention, reference will now be made to embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
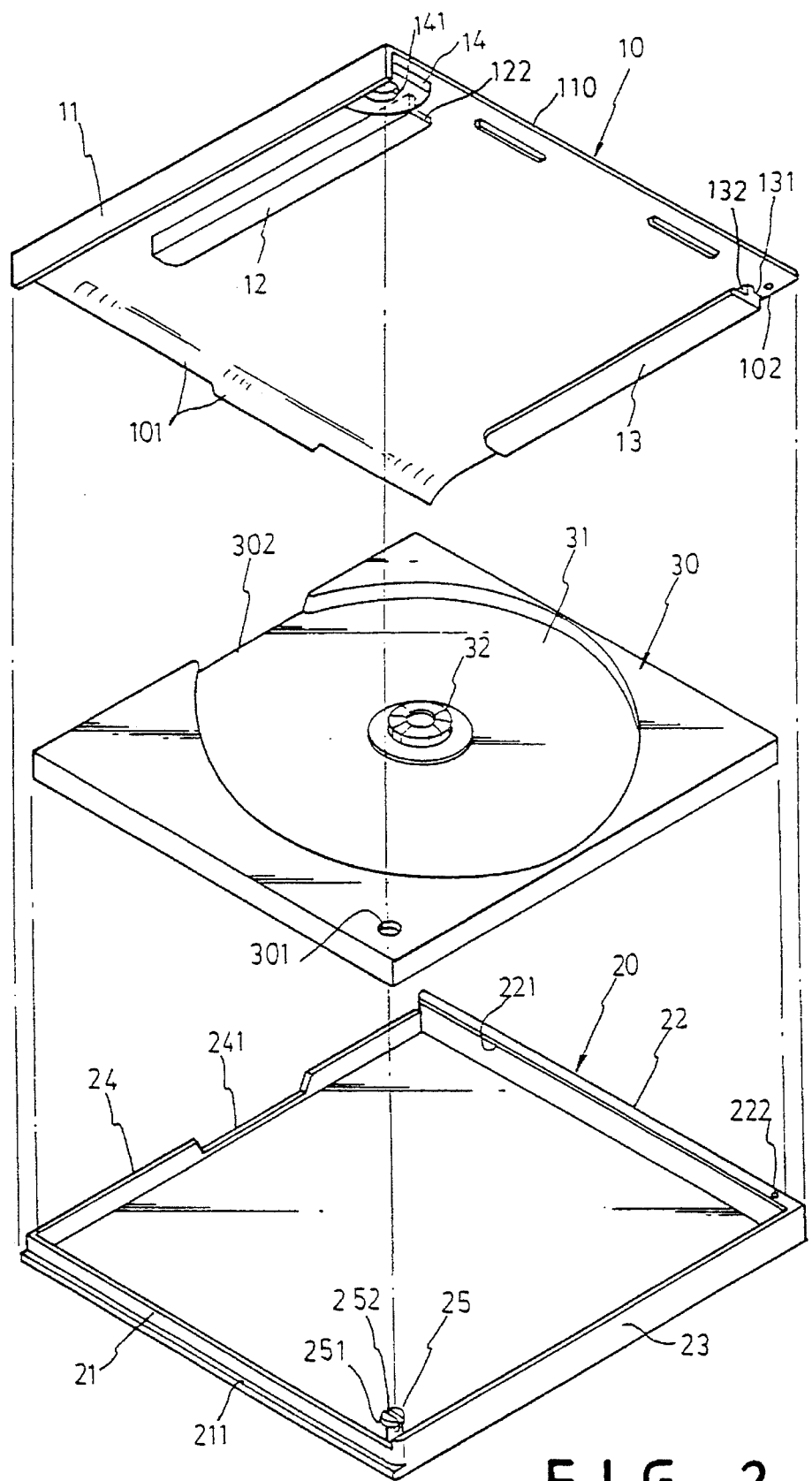
FIG. 2 is an exploded view of the present invention.

With reference to the drawings and in particular FIGS. 1 and 2 thereof, the compact disk container according to the present invention mainly comprises an upper cover 10, a lower cover 20 and a disk holder 30.

The upper cover 10 is formed with a vertical wall 11 downwardly depending from the left side (with respect to FIG. 2), an elongated L-shaped portion 12 downwardly depending from the bottom, and an elongated inverted T-shaped portion 13 downwardly depending from the bottom and close to the right side. The vertical wall 11, the L-shaped portion 12 and the inverted T-shaped portion 13 are parallel to each other. The L-shaped portion 12 and the inverted T-shaped portion 13 are respectively formed at the inner side with flaps 122 and 132 for receiving a song book, brochure, or the like (not shown). Further, the inverted T-shaped portion 13 has a second flap 131 at the outer side. A raised portion 14 is formed at the inside corner between the vertical wall 11 and the front edge 110 of the upper cover 10. The raised portion 14 has a through hole 141 counterbored at both ends. A recess 102 is formed at the inside corner between the inverted T-shaped portion 13 and the front edge 110 of the upper cover 10. The rear edge 101 of the upper cover 10 is formed with a curved surface at the inner side and one-half as high as the vertical wall 11.

The lower cover 20 includes a recess formed by a front wall 23, a right side wall 22 having the same height as the front wall 23, a left side wall 21 being one-half as high as the front wall 23, and a rear wall 24 having the same height as the left side wall 21. The lower portion of the left side wall 21 is formed with a flange 211o The upper portion of the right side wall 22 has a flange 221 provided with a protuberance 222 close to the front wall 23. The rear side wall 24 has a notch 241 at the intermediate portion. A pivot member 25 is provided at the corner between the left side wall 21 and the front side wall 23. The top end of the pivot member 25 has a circular flange 251 with a groove 252 thereon so that the pivot member 25 can recover the original shape after being pressed.

The disk holder 30 has the same height as the rear side wall 24 of the lower cover 20 and is just fitted into the lower cover 20. The central portion of the disk holder 30 is formed with a circular recess 31 for receiving a compact disk (not shown). The rear side of the disk holder 30 has a notch 302 for facilitating storing or retrieving the compact disk. Further, the disk holder 30 is provided at the center with a retainer 32 for keeping a compact disk in place. In addition, the disk holder 30 has an opening 301 at a corner for receiving the pivot member 25 of the lower cover 20.

Figure 3:
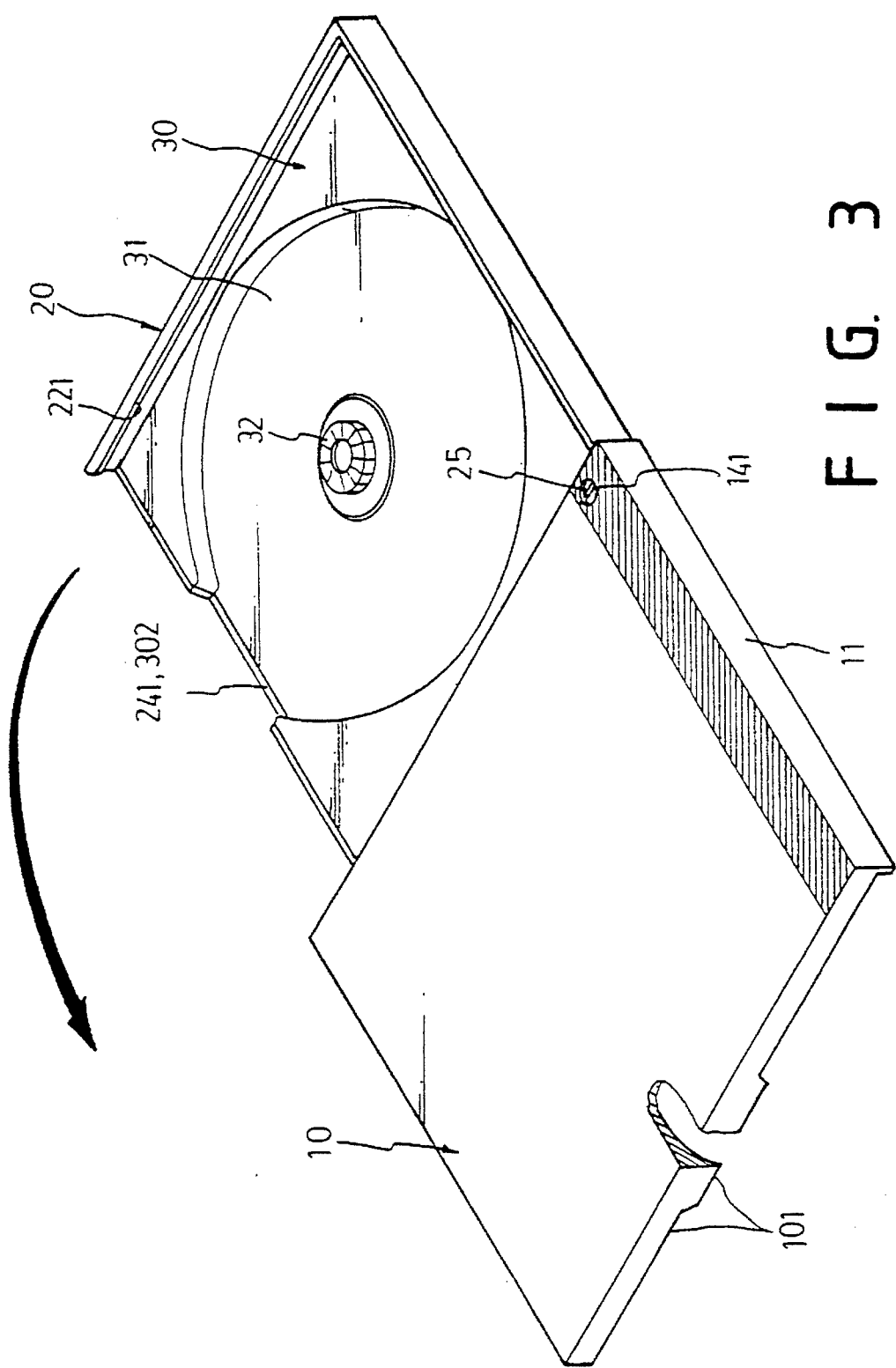
FIG. 3 shows the way to open the present invention.
Figure 4:
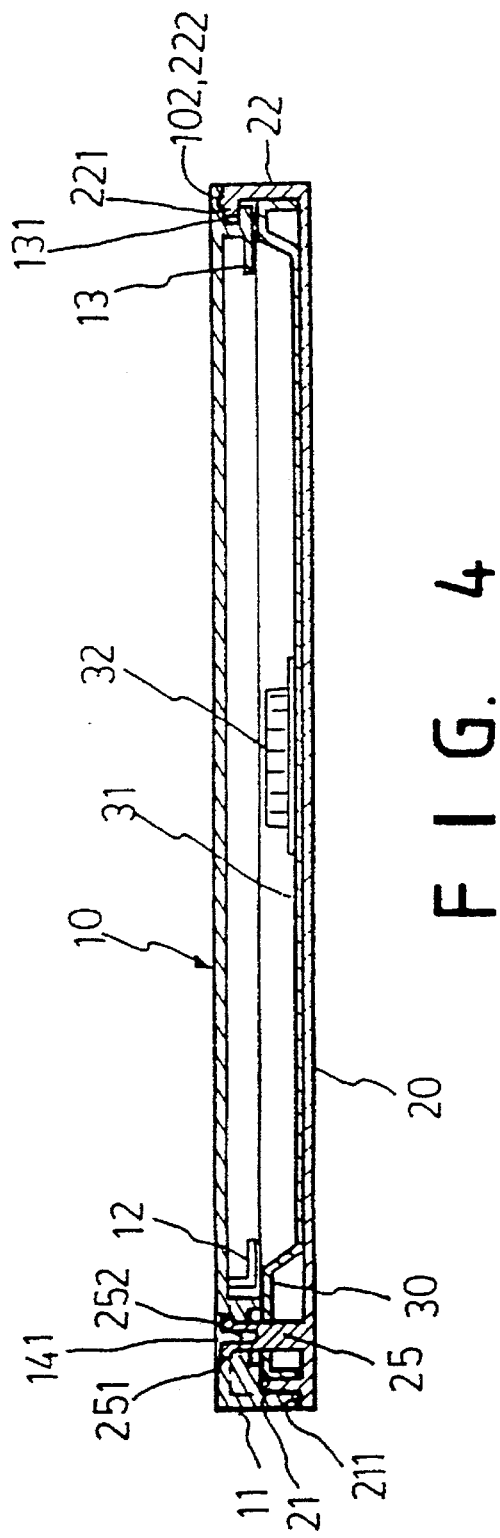
FIG. 4 is a sectional view taken along line 4—4 of FIG. 1.
Figure 5:
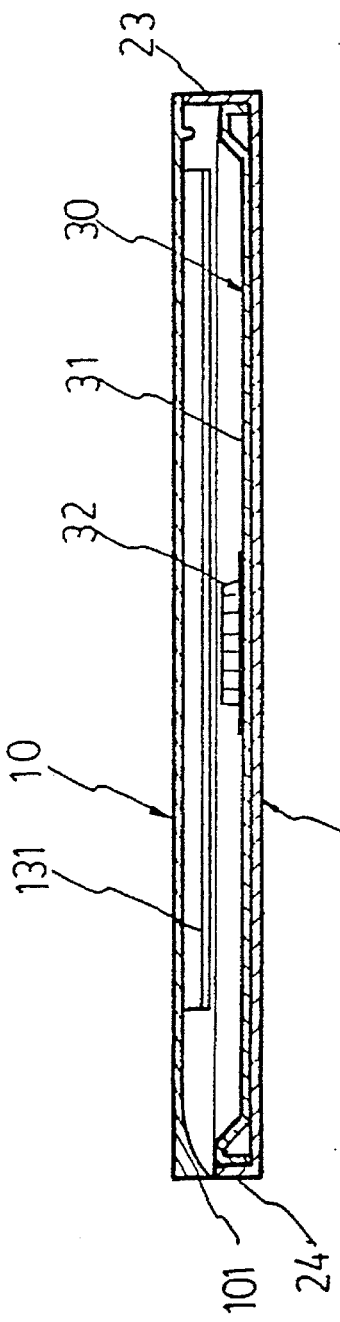
FIG. 5 is a sectional view taken along line 5—5 of FIG. 1.
Figure 6:
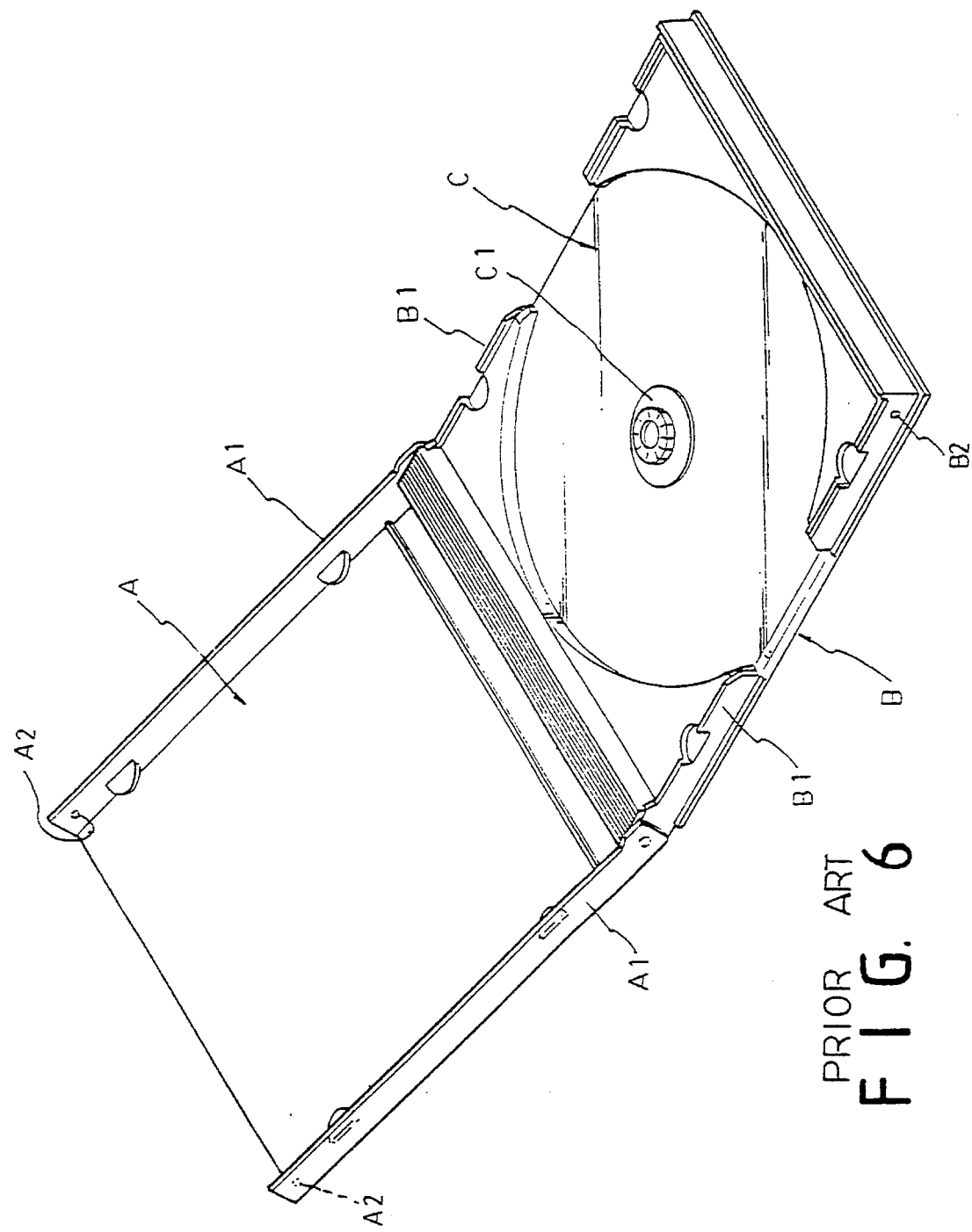
FIG. 6 illustrates a prior art compact disc carrying case.

Referring to FIGS. 3, 4 and 5, when the disk holder 30 is fitted in the lower cover 20, the pivot member 25 of the lower cover 20 protrudes upwardly through the opening 301 of the disk holder 30. Then, the upper cover 10 is fitted in the lower cover 20, with the pivot member 25 of the lower cover 20 engaged with the through hole 141 of the upper cover 10. As the through hole 141 of the upper cover 10 is counterbored at both ends, the upper cover 10 will be kept connected with the lower cover 20 by the pivot member 25. Hence, the upper cover 10 can be turned open as desired.

The L-shaped portion 12 and the inverted T-shaped portion 13 of the upper cover 10 are designed to receive a song book, brochure, or the like. As the upper cover 10 is rotated to close the lower cover 20, the right side wall 11 of the upper cover 10 is in contact with the left side wall 21 of the lower cover 20, while the second flap 131 of the inverted T-shaped portion 13 of the upper cover 10 is engaged with the flange 221 of the right side wall 22 of the lower cover 20 with the cavity 102 receiving the protuberance 222, thereby firmly keeping the compact disk container at a closed condition and preventing it from being opened inadvertently.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A compact disk container comprising:

an upper cover including a vertical wall downwardly depending from one side thereof, an elongated L-shaped portion downwardly depending from a bottom thereof, an elongated inverted T-shaped portion downwardly depending from the bottom and close to another side thereof, and a raised portion having a through hole counterbored at both ends, said upper cover having a front edge formed with a curved surface at an inner side;

a lower cover including a recess formed by a front side wall, a right side wall, a left side wall, and a rear side wall, said left side wall being formed with a flange at a lower portion, said right side wall having at an upper portion a flange provided with a protuberance close to said front side wall, said lower cover further having a pivot member with a circular flange having a groove therein; and a disk holder fitted into said lower cover, including a recess for receiving a compact disk, a retainer at a center of the recess for keeping the compact disk in place, and an opening for receiving the pivot member of said lower cover.

* * * * *